US008028597B2

(12) United States Patent
Cannon

(10) Patent No.: US 8,028,597 B2
(45) Date of Patent: Oct. 4, 2011

(54) LOW HORSEPOWER TRANSMISSION

(76) Inventor: John Cannon, Longview, TX (US)

(*) Notice: Subject to any disclaimer, the term of this patent is extended or adjusted under 35 U.S.C. 154(b) by 117 days.

(21) Appl. No.: 11/559,851

(22) Filed: Nov. 14, 2006

(65) Prior Publication Data

US 2007/0107541 A1    May 17, 2007

Related U.S. Application Data

(60) Provisional application No. 60/736,724, filed on Nov. 14, 2005.

(51) Int. Cl.
*F16H 3/14* (2006.01)

(52) U.S. Cl. ............................................. 74/355; 74/361

(58) Field of Classification Search .................. 74/329, 74/331, 355, 361
See application file for complete search history.

(56) References Cited

U.S. PATENT DOCUMENTS

| | | | |
|---|---|---|---|
| 1,442,057 A * | 1/1923 | Bernhard | 74/376 |
| 2,039,665 A * | 5/1936 | Rossetter | 74/376 |
| 2,299,563 A * | 10/1942 | Carlson et al. | 74/376 |
| 2,999,397 A * | 9/1961 | Gustave | 74/377 |
| 3,071,021 A * | 1/1963 | Miller | 74/377 |
| 3,479,895 A * | 11/1969 | Wegener | 74/333 |
| 3,766,794 A * | 10/1973 | Wilcox | 74/355 |
| 3,799,283 A | 3/1974 | Freber | |
| 3,829,117 A | 8/1974 | Park | |
| 4,138,006 A * | 2/1979 | Benson, Jr. | 192/48.91 |
| 4,310,081 A * | 1/1982 | Kolacz | 192/219.5 |
| 4,682,668 A | 7/1987 | Salmon et al. | |
| 4,732,330 A * | 3/1988 | Groeneveld et al. | 239/670 |
| 4,813,290 A * | 3/1989 | Hone | 74/15.88 |
| 4,896,899 A | 1/1990 | Lawrence | |
| 4,924,720 A * | 5/1990 | Shust | 74/377 |
| 5,328,011 A | 7/1994 | Brister et al. | |
| 5,921,341 A | 7/1999 | Atkins | |
| 6,367,345 B1 * | 4/2002 | Yeh | 74/377 |
| 6,637,283 B2 * | 10/2003 | Belloso | 74/342 |
| 6,694,837 B2 * | 2/2004 | Yeh | 74/377 |
| 6,732,602 B2 * | 5/2004 | Lu | 74/336 R |
| 6,749,039 B1 | 6/2004 | Uphaus | |
| 6,851,329 B2 * | 2/2005 | Chiang | 74/355 |
| 6,860,512 B2 | 3/2005 | Lawson, Jr. | |
| 2005/0103554 A1 | 5/2005 | Meglioli | |

* cited by examiner

*Primary Examiner* — Justin Holmes
(74) *Attorney, Agent, or Firm* — Scott T. Griggs; Griggs Bergen LLP

(57) ABSTRACT

A low horsepower transmission is disclosed. In one embodiment, a drive shaft is operably coupled to a prime mover and a driven shaft is axially aligned with the drive shaft and operably coupled to a rotary load. Two sets of geared wheels are aligned and rotatably mounted to opposite sides of the drive shaft and the driven shaft. A shuttle clutch positioned on the driven shaft is operable to reciprocate between mating engagement with a clutch associated with the first set of geared wheels and a clutch associated with the second set of geared wheels. The engagement of the shuttle clutch determines which set of geared wheels will transmit torque.

22 Claims, 3 Drawing Sheets

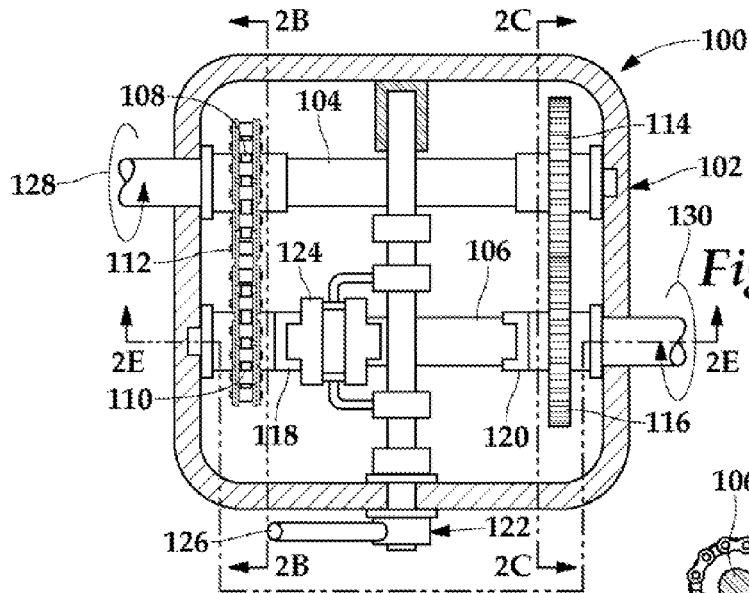
*Fig.2A*
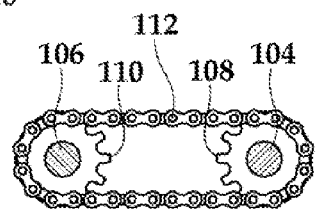
*Fig.2B*
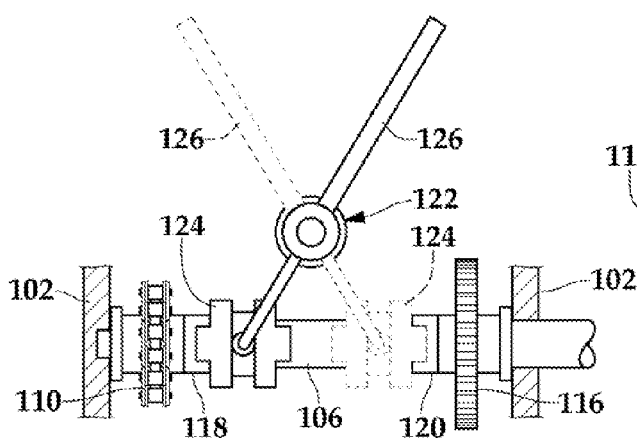
*Fig.2D*
*Fig.2C*
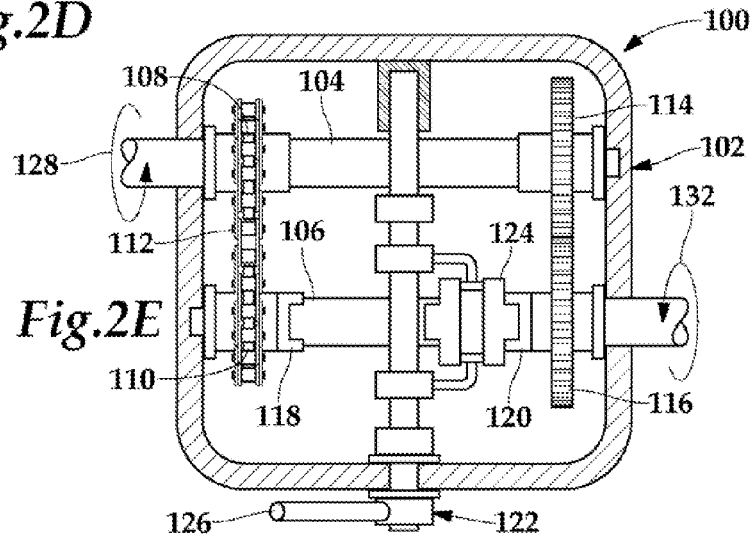
*Fig.2E*

LOW HORSEPOWER TRANSMISSION

PRIORITY STATEMENT & CROSS-REFERENCE TO RELATED APPLICATIONS

This application claims priority from co-pending U.S. Patent Application No. 60/736,724, entitled "Transmission for a Low Horse Power Vehicle" and filed on Nov. 14, 2005, in the name of John Cannon; which is hereby incorporated by reference for all purposes.

TECHNICAL FIELD OF THE INVENTION

This invention relates, in general, to transmissions and, in particular, to transmissions for low horsepower applications.

BACKGROUND OF THE INVENTION

Transmissions for low horsepower applications transmit mechanical power from a prime mover, such as an engine or electric motor, to some form of useful output device, normally rotary in form, and generally at a reduced rate of angular speed but at a higher motive torque. Unlike regular transmissions, however, transmissions for low horsepower applications typically operate with engines and electric motors varying in power from fractions of one horsepower to approximately 20horsepower. Existing low horsepower transmissions do not economically provide more than a single speed, i.e., either high/low speeds, or more than a single drive direction, i.e., forward/reverse drives. A need exists for a low cost, improved low horsepower transmission that provides high/low speeds as well as an improved transmission that provides forward/reverse drives.

SUMMARY OF THE INVENTION

A low cost, improved transmission for low horsepower applications is provided. In one embodiment, a drive shaft is operably coupled to a prime mover and a driven shaft is axially aligned with the drive shaft and operably coupled to a rotary load. Two sets of geared wheels are aligned and rotatably mounted to opposite sides of the drive shaft and the driven shaft. A shuttle clutch positioned on the driven shaft is operable to reciprocate between mating engagement with a clutch associated with the first set of geared wheels and a clutch associated with the second set of geared wheels. The engagement of the shuttle clutch determines which set of geared wheels will transmit torque. Depending on the configuration of the geared wheels, the transmission can provide high/low speeds and/or forward/reverse drives in a low horsepower application, for example.

BRIEF DESCRIPTION OF THE DRAWINGS

For a more complete understanding of the features and advantages of the present invention, reference is now made to the detailed description of the invention along with the accompanying figures in which corresponding numerals in the different figures refer to corresponding parts and in which:

FIG. 2A is a top sectional view of one embodiment of a transmission providing forward/reverse drive in which parts are shown broken away to disclose details of construction;

FIG. 2B is a transverse sectional view along line 2B-2B of FIG. 2A;

FIG. 2C is a transverse sectional view along line 2C-2C of FIG. 2A;

FIG. 2D is a transverse sectional view along line 2D-2D of FIG. 2A; and

FIG. 2E is a second top sectional view of the transmission presented in FIG. 2A.

DETAILED DESCRIPTION OF THE INVENTION

While the making and using of various embodiments of the present invention are discussed in detail below, it should be appreciated that the present invention provides many applicable inventive concepts which can be embodied in a wide variety of specific contexts. The specific embodiments discussed herein are merely illustrative of specific ways to make and use the invention, and do not delimit the scope of the present invention.

Figure 1A:
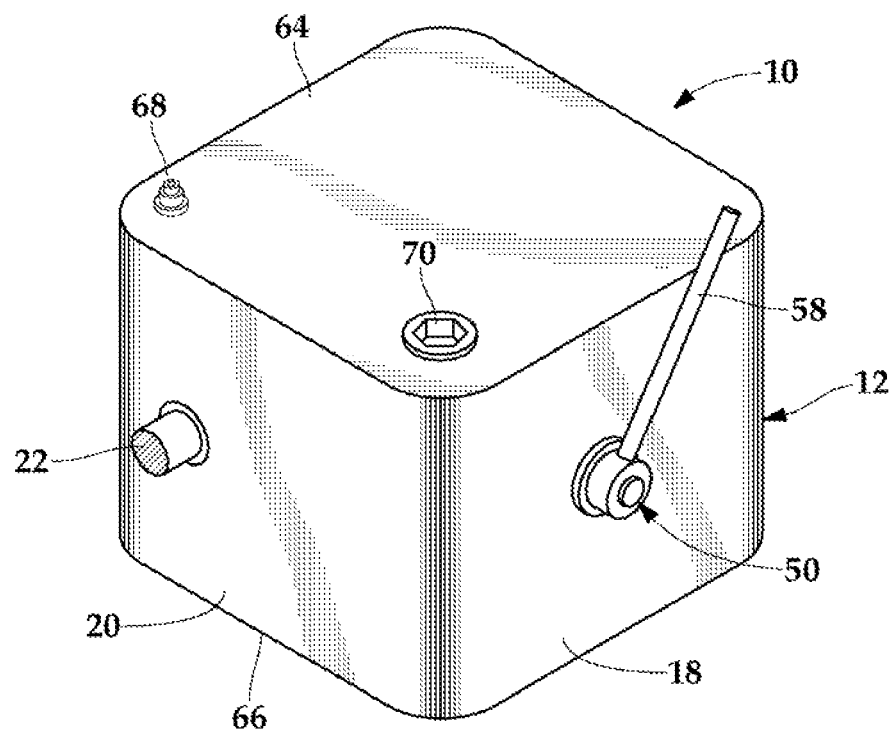
FIG. 1A is a perspective view of one embodiment of a transmission for low horsepower applications.
Figure 1B:
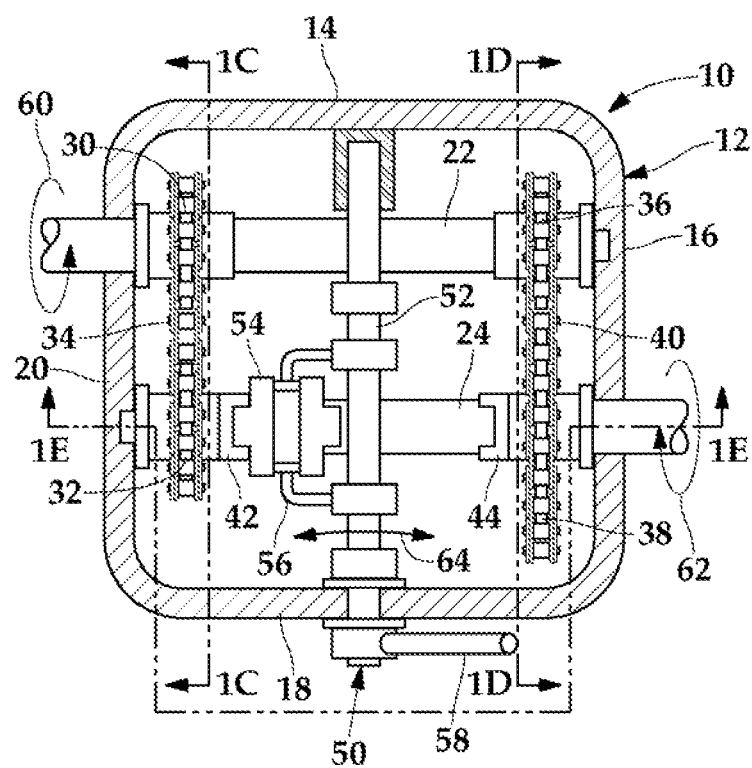
FIG. 1B is a top sectional view of the transmission presented in FIG. 1A in which parts are shown broken away to disclose details of construction and in which a first set of geared wheels are providing torque.

Referring initially to FIGS. 1A and 1B, therein is depicted one embodiment of a transmission 10 providing, as will be discussed in further detail hereinbelow, selection between two sets of geared wheels. Each set of geared wheels may include a different gear ratio and/or different drives, i.e., forward and reverse. Depending on the configuration of the geared wheels, the transmission can provide high/low speeds and/or forward/reverse drives in a low horsepower application, for example.

The illustrated high/low speed embodiment comprises a housing 12 having sides 14, 16, 18, and 20. A drive shaft 22 and a driven shaft 24 are journalled in the opposed sides 16 and 20 of the housing 12 and are axially aligned. An end of the drive shaft 22 at side 16 is provided with an anti-friction bearing element such as a trunnion. Similarly, an end of driven shaft 24 at side 20 is provided with an anti-friction bearing element. In one implementation, the drive shaft 22 is coupled to the engine, which is in approximately the fraction of one (i.e., fractional) to 20horsepower range, via a torque converter or other conventional connection. More preferably, the engine is in the fraction of one to eight horsepower range. Depending on the application, the drive shaft 22 may be coupled to the engine via a torque converter, sprocket assembly, or pulley assembly, for example.

A first set of sprockets defined by sprocket 30 and sprocket 32 are aligned and rotatably mounted on the drive shaft 22 and the driven shaft 24, respectively. In the illustrated implementation, the sprockets 30 and 32 have the same pitch. In other implementations, the sprockets may have differing pitches. An endless chain 34 engages the sprockets 30 and 32 such that the driven shaft 22 and the driven shaft 24 are coupled for concurrent rotation.

A second set of sprockets, sprocket 36 and sprocket 38, having different pitch diameters are aligned and rotatably mounted to the drive shaft 22 and the driven shaft 24, respectively. It should be appreciated, that in other implementations, the sprockets may have identical pitches. An endless chain 40 engages the sprockets 36 and 38 to provide a step-down ratio between the drive shaft 22 and the driven shaft 24.

A sprocket clutch 42, which may be referred to as a clutch, is coupled to the sprocket 32 on the driven shaft 24 and a step-down sprocket clutch 44, which may also be referred to as a clutch, is coupled to the sprocket 38 on the driven shaft 24. A shuttle clutch assembly 50 includes a shaft axle 52 that is orthogonally superposed over the drive shaft 22 and driven shaft 24 and secured for rotation to opposing sides 14 and 18 of the housing 12. A shuttle clutch 54 is slidably secured to the driven shaft 24. Opposing sides of the shuttle clutch 54 are keyed to mated with the sprocket clutch 42 and step-down sprocket clutch 44, respectively. It should be appreciated that the mating ends of the shuttle clutch 54 and receiving ends of the sprocket clutch 42 and step-down sprocket clutch 44 may have any complimentary shapes.

Oil impregnated bearings are utilized to maintain the sprockets 30 and 36 associated with the drive shaft 22 as well as the sprockets 32 and 38 associated with the driven shaft 24 in constant motion. The driven shaft 24 is motionless until the shuttle clutch 54 engages either the sprocket clutch 42 or step-down sprocket clutch 44 as described in detail hereinbelow.

A yoke 56 couples the shuttle clutch 54 to the shaft axle 52. A pivot arm 58 is coupled to the shaft axle 52 at side 18 such that actuation of the pivot arm 58 rotates the shaft axle 52. Actuation of the pivot arm 58 may be by mechanical, electrical, or manual means, for example. Additionally, the pivot arm 58 may be operated by a linkage, a cable, or other suitable means, for example. The yoke 56 translates the rotational movement of the shaft axle 52 into lateral movement of the shuttle clutch 54 along the driven shaft 24.

The housing 12 of transmission 10 is sealed with a top cover 64, a bottom cover 66, and various seals. In one embodiment, the components of the transmission 10 are within an oil bath. Necessary release valves, such as release valve 68, which is illustrated as a hose barb in the top cover 64, are provided. Service openings, as depicted by service plug 70, for example, are provided for the periodic change and maintenance of the oil bath.

The transmission 10 transmits torque, as represented by arrow 60, from a prime mover which provides input torque to the drive shaft 22 to a rotary load which is coupled to the driven shaft 24. The torque transmitted to the rotary load is represented by arrow 62. Actuation, whether mechanical, electrical, or manual, of the pivot arm 58 reciprocates the shuttle clutch 54 between the sprocket clutch 42 and the step-down sprocket clutch 44 as depicted by double headed arrow 64. When the shuttle clutch 54 engages the sprocket clutch 42, the first set of sprockets 30 and 32 transfer torque in order that the drive shaft 22 and the driven shaft 24 rotate concurrently. Alternatively, when the shuttle clutch 54 engages the step-down sprocket clutch 44, as depicted in FIG. 1G, the second set of sprockets transmit torque in order that the drive shaft 22 and the driven shaft 24 rotate at different rates as dictate by the ratio of the pitch between the sprocket 36 and the sprocket 38 and are linked for rotation by endless chain 40.

Figure 1C:
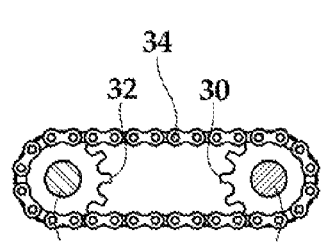
FIG. 1C is a transverse sectional view along line 1C-1C of FIG. 1B.
Figure 1D:
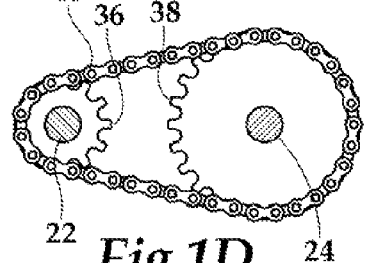
FIG. 1D is a transverse sectional view along line 1D-1D of FIG. 1B.
Figure 1F:
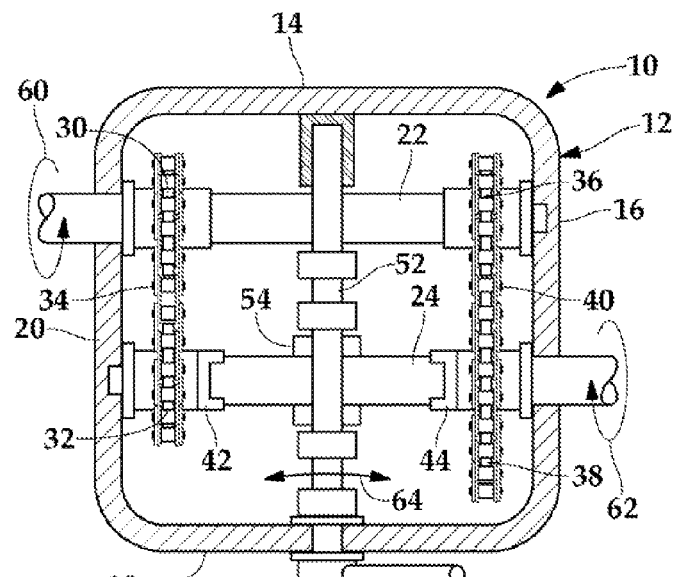
FIG. 1F is a top sectional view of the transmission presented in FIG. 1B in which the transmission is in a neutral position.

FIG. 1C depicts the first set of sprockets 30 and 32 in further detail. The sprockets 30 and 32 are mounted for concurrent rotational movement to the drive shaft 22 and the driven shaft 24, respectively, and are engaged by the endless chain 34. The first set of sprockets 30 and 32 are in a 1:1 ratio, for example. Similarly, FIG. 1D depicts the second set of sprockets 36 and 38 in further detail. The second set of sprockets 36 and 38 are in a 2:1, ratio, for example. It should be appreciated that the second set of sprockets may have different pitches as well. Additionally, the second set of sprockets may have a ratio different from that illustrated.

Figure 1E:
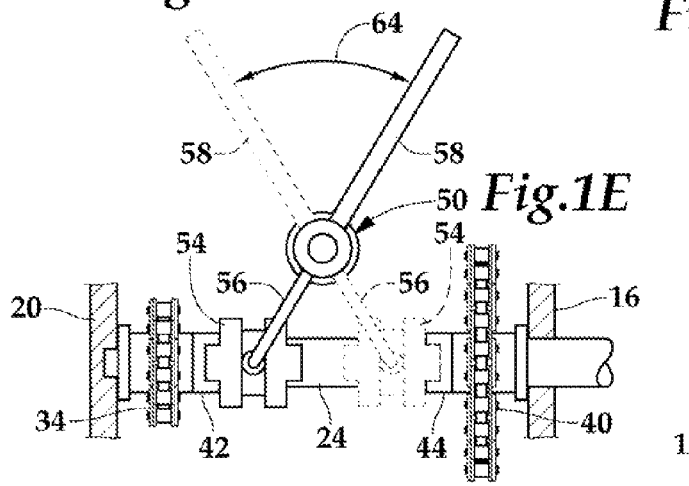
FIG. 1E is a transverse section view along line 1E-1E of FIG. 1B.
Figure 1G:
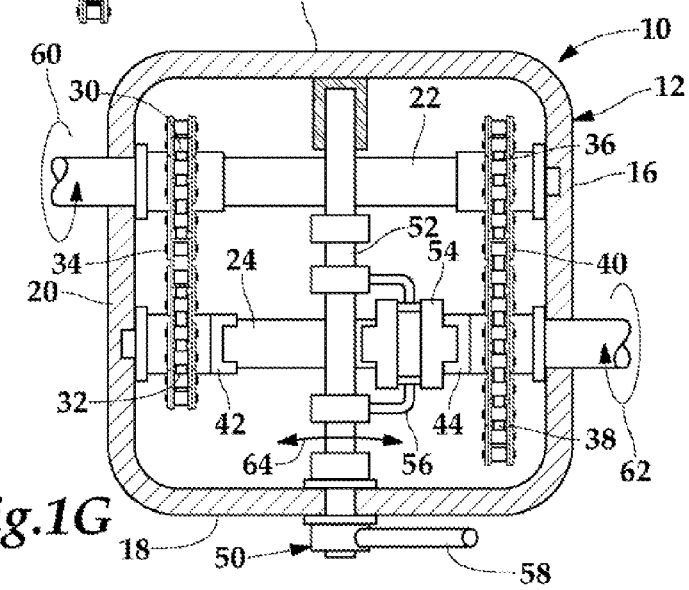
FIG. 1G is a top sectional view of the transmission presented in FIG. 1B in which a second set of geared wheels are providing torque.

FIG. 1E depicts the shuttle clutch assembly 50 in further detail. As previously discussed, the actuation of the pivot arm 58, as indicated by arrow 64, causes the shuttle clutch 54 to traverse the driven shaft 24 as indicated by the ghosted shuttle clutch assembly 50. It should be appreciated that although the shuttle clutch assembly 50 and associated clutches 42 and 44 are described as being operable with the driven shaft 24, these components may be outfitted for utilization with the drive shaft 22 as well.

Referring now to FIG. 1F, the shuttle clutch assembly 50 and, in particular, the shuttle clutch 54 are positioned in a neutral position between the clutches 42 and 44. In the neutral position illustrated, the sprockets 32 and 38 are in constant motion, while the driven shaft 24 is motionless. The driven shaft 24 stays motionless until the shuttle clutch 54 is moved left or right into a mating engagement with the clutch 42 or the clutch 44 using the illustrated shifting mechanism.

Further, the shuttle clutch assembly 50 transitions from the mating engagement with the clutch 42 through the neutral position of FIG. 1F to a mating engagement with the clutch 44, as shown in FIG. 1G, when the drive shaft 22 and driven shaft 24 are not rotating. Similarly, the shuttle clutch assembly 50 is operable to disengage from the clutch 44 and transition through the neutral position of FIG. 1F to engage the clutch 42 when the drive shaft 22 and driven shaft 24 are not in motion.

FIG. 2A depicts one embodiment of a transmission 100 that provides forward/reverse drive. Similar to transmission 10 described hereinabove, the transmission 100 includes a housing 102 having a drive shaft 104 and driven shaft 106 mounted therein for rotational movement. As also seen in FIG. 2B, a set of sprockets 108 and 110, engaged by an endless chain 112, are mounted on the drive shaft 104 and the driven shaft 106, respectively. As also seen in FIG. 2C, a set of spur gears 114 and 116 are also mounted to the drive shaft 104 and the driven shaft 106, respectively. A sprocket clutch 118, which may be referred to as a clutch, is coupled to the sprocket 110 and a spur gear clutch 120, which may be referred to as a clutch, is coupled to the spur gear 116.

With reference to FIG. 2D, a shuttle clutch assembly 122, which is similar to the shuttle clutch assembly 50, includes a shuttle clutch 124 that, in response to actuation of a pivot arm 126, travels the driven shaft 106 between the sprocket clutch 118 and the spur gear clutch 120. When the sprocket clutch 118 is engaged, as illustrated in FIG. 2A, the driven shaft 106 rotates concurrently with the driven shaft 104 as indicated by arrow 128 and arrow 130.

To the contrary, as illustrated in FIG. 2E, when the shuttle clutch 124 mates with the spur gear clutch 120, the driven shaft 106 rotates in an opposing direction to the drive shaft 104 as indicated by arrows 128 and 132. The opposing rotation is a result of the engagement of the meshed spur gears 114 and 116 and the disengagement between the sprocket 110 and the driven shaft 106.

Accordingly, the transmission 10 presented in FIG. 1A through 1G utilizes two sets of sprockets to provide varying rates of rotation, e.g., a "high gear" and a "low gear." The transmission presented in FIGS. 2A through 2E utilizes one set of sprockets and one set of gears to provide two directions of rotation, e.g., a "forward gear" and a "reverse gear." It should be appreciated that combining characteristics of these two transmissions is within the teachings of the present invention. For example, one set of sprockets having the same pitch and one set of gears having a different pitch may be used to provide a forward gear and a reverse low gear.

In particular, in one implementation, the transmission described herein includes a drive shaft operably coupled to a prime mover and a driven shaft axially aligned with the drive shaft. As previously discussed, the driven shaft is operably coupled to a rotary load. A set, e.g., first and second, geared wheels are aligned and rotatably mounted on the drive shaft and the driven shaft, respectively. The first and second geared wheels are operable to transmit rotation therebetween. Similarly, a second set, e.g., third and fourth, geared wheels are similarly aligned and rotatably mounted on the drive shaft and the driven shaft, respectively. Also, likewise, the third and fourth geared wheels are operable to transmit rotation therebetween. The first and second geared wheels may comprise sprockets or spur gears of the same or different pitches. Similarly, the third and fourth geared wheels may comprise sprockets or spur gears of the same or different pitches.

Clutches are coupled to the second geared wheel and fourth geared wheel on the driven shaft. A shuttle clutch is slidably secured to the driven shaft and operable to reciprocate between mating engagement with the first clutch and mating engagement with the second clutch. When the shuttle clutch mates with the first clutch, the first and second geared wheels transmit torque and when the shuttle clutch mates with the second clutch, the third and fourth geared wheels transmit torque. When the clutch engages neither of the clutches, torque is not transferred from the driven shaft to the driven shaft.

In another embodiment, as previously alluded to, the clutches are alternatively coupled to the first geared wheel and third geared wheel on the driven shaft. A shuttle clutch is slidably secured to the drive shaft and operable to reciprocate between mating engagement with the first clutch and mating engagement with the second clutch.

By way of example and not by way of limitation, the following table, Table I: Exemplary Configurations of the Low Horsepower Transmission, provides a non-exhaustive matrix of exemplary configurations of the transmission disclosed herein.

TABLE I

Exemplary Configurations of the Low Horsepower Transmission

| First Set of Geared Wheels | Second Set of Geared Wheels | Application Capability |
|---|---|---|
| Sprockets of Identical Pitches Coupled for Concurrent Rotation | Sprockets of Differing Pitches Linked for Rotation | Two Speed Forward |
| Sprockets of Identical Pitches Coupled for Concurrent Rotation | Meshed Gears of Identical Pitches | One Speed Forward/Reverse |
| Sprockets of Identical Pitches Coupled for Concurrent Rotation | Meshed Gears of Differing Pitches | One Speed Forward and a Second Speed Reverse |
| Sprockets of Differing Pitches Linked for Rotation | Sprockets of Identical Pitches Coupled for Concurrent Rotation | Two Speed Forward |
| Sprockets of Differing Pitches Linked for Rotation | Meshed Gears of Identical Pitches | One Speed Forward and a Second Speed Reverse |
| Sprockets of Differing Pitches Linked for Rotation | Meshed Gears of Differing Pitches | One Speed Forward and a Second Speed Reverse |
| Meshed Gears of Identical Pitches | Sprockets of Identical Pitches Coupled for Concurrent Rotation | One Speed Reverse/Forward |
| Meshed Gears of Identical Pitches | Sprockets of Differing Pitches Linked for Rotation | One Speed Reverse and a Second Speed Forward |
| Meshed Gears of Identical Pitches | Meshed Gears of Different Pitches | Two Speed Reverse |
| Meshed Gears of Differing Pitches | Sprockets of Identical Pitches Coupled for Concurrent Rotation | One Speed Reverse and a Second Speed Forward |
| Meshed Gears of Differing Pitches | Sprockets of Differing Pitches Linked for Rotation | One Speed Reverse and a Second Speed Forward |
| Meshed Gears of Differing Pitches | Meshed Gears of Identical Pitches | Two Speed Reverse |

In a low torque application, a prototype transmission was built being 6, inches (15.2, centimeters) long by 5, inches (12.7, centimeters) wide by 4, inches (10.1centimeters) tall. The drive shaft and the driven shaft were both approximately ⅝ , inches (1.6, centimeters) in diameter. The prototype, based on the design presented herein, had a minimum number of moving parts and was able to utilize bronze bearings as opposed to ball bearings. Further, square drive components were utilized instead of splines and the construction required only double lip seals to maintain the oil bath. Accordingly, the cost was minimal and affordable for low torque applications. The prototype transmission as well as the low torque transmission described herein have various low torque applications; some of which will now be described. It should be appreciated, however, that these are non-limiting examples of applications.

Vehicles such as minibikes, go-carts, golf carts, and all terrain vehicles as well as lawnmowers may utilize the low horsepower transmission presented herein to provide high/low gears and/or forward and reverse drive. By way of example, the typical go-cart includes a metal frame of welded steel that defines a seating area large enough for one individual. An internal combustion engine provides rotary power to an axle coupled to the rear wheels. Contrary to the desires of go-cart enthusiasts, however, existing transmissions and clutch assemblies that provide more than a single speed, i.e., either high/low speeds or forward/reverse drives, are expensive. In particular, it is not uncommon for a forward/reverse go-cart transmission to double the cost of the go-cart. The low horsepower transmission of the present invention provides go-carts with an economical and efficient transmission having high/low speeds or forward/reverse drives, for example.

Pedal cars are a type of quadracycle designed for adult transportation. These vehicles are popular for recreation and with tourists. Similarly, toy cars and "big wheels" are types of pedal cars intended for use by children. The low horsepower transmission presented herein may be utilized with pedal cars or toy cars to provide forward/reverse capabilities, for example, to the vehicles. In these types of applications, the transmission may comprise plastic or composite components, as opposed to metal components, and the pedals may be connected to the transmission by a chain assembly, for example.

With respect to non-vehicular applications, the transmission may be employed with conveyor systems, portable sawmills, winch applications, power tools, and with various types of industrial and agricultural equipment. By way of example, a conveyor system uses a wide belt and at least two pulleys to provide a continuous loop of material therebetween that is supported by rollers. The pulleys are powered to move the belt and the material on the belt either forward or reverse. One or more transmissions presented herein may be utilized to provide forward/reverse capabilities to each shaft which turns a pulley.

By way of a further example, portable sawmills are typically utilized to produce and further refine timber after the timber has left a large lumber yard. The portable sawmill includes a re-saw blade of the type used on a band saw rather than a circular blade. This results in reduced weight and cost and allows for a design where the head, consisting of the blade and a power source, moves back and forth on a track while the work piece of lumber being cut remains stationary. The transmission presented herein may be integrated into the drive system of the portable sawmill to permit the drive saw to move back and forth on the track.

With respect to the above description then, it is to be realized that the optimum dimensional relationships for the components of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Further, while this invention has been described with reference to illustrative embodiments, this description is not intended to be construed in a limiting sense. Various modifications and combinations of the illustrative embodiments as well as other embodiments of the invention, will be apparent to persons skilled in the art upon reference to the description. It is, therefore, intended that the appended claims encompass any such modifications or embodiments.

What is claimed is:

1. A low horsepower transmission, comprising:
    a drive shaft configured for being operably coupled to a prime mover and extending along a drive shaft axis;
    a driven shaft extending along a driven shaft axis, the driven shaft axis being parallel to the drive shaft axis, the driven shaft being operably configured for being operably coupled to a rotary load the drive shaft axis and the driven shaft axis being on a first plane;
    first and second geared wheels being aligned and rotatably mounted on the drive shaft and the driven shaft, respectively, the first and second geared wheels being operable to transmit rotation therebetween;
    third and fourth geared wheels being aligned and rotatably mounted on the drive shaft and the driven shaft, respectively, the third and fourth geared wheels being operable to transmit rotation therebetween;
    a first clutch coupled to the second geared wheel on the driven shaft;
    a second clutch coupled to the fourth geared wheel on the driven shaft;
    a shaft axle orthogonally superposed over the drive shaft and driven shaft, the shaft axle operable for rotational movement in response to actuation of a pivot arm coupled thereto, the pivot arm traversing a plane orthogonal to the shaft axle said shaft axle extending parallel to the first plane; and
    a shuttle clutch slidably secured to the driven shaft for lateral movement thereon, the shuttle clutch operable to reciprocate between mating engagement with the first clutch and mating engagement with the second clutch, the shuttle clutch being coupled to a yoke that translates the rotational movement of the shaft axle into the lateral movement of the shuttle clutch on the driven shaft;
    wherein when the shuttle clutch mates with the first clutch, the first and second geared wheels transmit torque and when the shuttle clutch mates with the second clutch, the third and fourth geared wheels transmit torque.

2. The low horsepower transmission as recited in claim 1, wherein the ratio between the first and second geared wheels is different than the ratio between the third and fourth geared wheels.

3. The low horsepower transmission as recited in claim 1, wherein the first and second geared wheels comprise sprockets coupled together for concurrent rotation.

4. The low horsepower transmission as recited in claim 3, wherein the first and second sprockets have identical pitches.

5. The low horsepower transmission as recited in claim 3, wherein the first and second sprockets have different pitches.

6. The low horsepower transmission as recited in claim 1, wherein the third and fourth geared wheels comprise sprockets coupled together for concurrent rotation.

7. The low horsepower transmission as recited in claim 6, wherein the third and fourth sprockets have identical pitches.

8. The low horsepower transmission as recited in claim 6, wherein the third and fourth sprockets have different pitches.

9. The low horsepower transmission as recited in claim 1, wherein the first and second geared wheels comprise spur gears meshed for opposing rotation.

10. The low horsepower transmission as recited in claim 1, wherein the third and fourth geared wheels comprise spur gears meshed for opposing rotation.

11. The low horsepower transmission as recited in claim 1, wherein opposing sides of the shuttle clutch are keyed to mate with the first and second clutches, respectively.

12. The low horsepower transmission as recited in claim 1, wherein the first and second geared wheels comprise first and second sprockets, respectively, coupled together by a chain for concurrent rotation,
    wherein the third and fourth geared wheels comprise first and second spur gears, respectively, being meshed for opposing rotation,
    wherein when the shuttle clutch mates with the first clutch, the first and second sprockets transmit torque and when the shuttle clutch mates with the second clutch, the first and second spur gears transmit reverse torque.

13. The low horsepower transmission as recited in claim 12, wherein the ratio between the first and second sprockets is different than the ratio between the first and second spur gears.

14. The low horsepower transmission as recited in claim 12, wherein opposing sides of the shuttle clutch are keyed to mate with the first and second clutches, respectively.

15. A low horsepower transmission, comprising:
    a sealed housing;
    a drive shaft configured for being operably coupled to a prime mover and extending along a drive shaft axis, the drive shaft being journalled in opposed sides of the sealed housing;
    a driven shaft extending along a driven shaft axis, the driven shaft axis being parallel to the drive shaft axis, the driven shaft being operably configured for being operably coupled to a rotary load, the driven shaft being journalled in the opposed sides of the sealed housing the drive shaft axis and the driven shaft axis being on a first plane;
    first and second geared wheels being aligned and rotatably mounted on the drive shaft and the driven shaft, respectively, the first and second geared wheels being operable to transmit rotation therebetween;
    third and fourth geared wheels being aligned and rotatably mounted on the drive shaft and the driven shaft, respectively, the third and fourth geared wheels being operable to transmit rotation therebetween;

a first clutch coupled to the second geared wheel on the driven shaft;

a second clutch coupled to the fourth geared wheel on the driven shaft;

a shaft axle orthogonally superposed over the drive shaft and driven shaft, the shaft axle operable for rotational movement in response to actuation of a pivot arm coupled thereto, the pivot arm traversing a plane orthogonal to the shaft axle, the pivot arm being exterior to the sealed housing said shaft axle extending parallel to the first plane; and a shuttle clutch slidably secured to the driven shaft for lateral movement thereon, the shuttle clutch operable to reciprocate between mating engagement with the first clutch and mating engagement with the second clutch by passing through neutral therebetween, the shuttle clutch being coupled to a yoke that translates the rotational movement of the shaft axle into the lateral movement of the shuttle clutch on the driven shaft;

wherein when the shuttle clutch mates with the first clutch, the first and second geared wheels transmit torque and when the shuttle clutch mates with the second clutch, the third and fourth geared wheels transmit torque.

16. A low horsepower transmission, comprising:

a drive shaft configured for being operably coupled to a prime mover and extending along a drive shaft axis;

a driven shaft extending along a driven shaft axis, the driven shaft axis being parallel to the drive shaft axis, the driven shaft being operably configured for being operably coupled to a rotary load, the drive shaft axis and the driven shaft axis being on a first plane;

first and second geared wheels being aligned and rotatably mounted on the drive shaft and the driven shaft, respectively, the first and second geared wheels being operable to transmit rotation therebetween;

third and fourth geared wheels being aligned and rotatably mounted on the drive shaft and the driven shaft, respectively, the third and fourth geared wheels being operable to transmit rotation therebetween;

a first clutch coupled to the second geared wheel on the driven shaft;

a second clutch coupled to the fourth geared wheel on the driven shaft;

a shifter axle extending parallel to the first plane, orthogonal to the drive shaft axle, and orthogonal to the driven shaft axle and extending across the drive shaft and the driven shaft, the shifter axle operable for pivotal movement in response to actuation of a pivot shifter arm coupled thereto, the pivot shifter arm configured for traversing a second plane orthogonal to the shifter axle; and a shuttle clutch slidably secured to the driven shaft for lateral movement thereon, the shuttle clutch operable to reciprocate between mating engagement with the first clutch and mating engagement with the second clutch, the shuttle clutch being coupled to a yoke that translates the pivotal movement of the shifter axle into the lateral movement of the shuttle clutch on the driven shaft, wherein when the shuttle clutch mates with the first clutch, the first and second geared wheels transmit torque, and when the shuttle clutch mates with the second clutch, the third and fourth geared wheels transmit torque.

17. The low horsepower transmission as recited in claim 16, wherein the second plane is orthogonal to the first plane.

18. The low horsepower transmission as recited in claim 16, wherein the first and second geared wheels comprise sprockets coupled together by a chain for concurrent rotation.

19. The low horsepower transmission as recited in claim 16, wherein the third and fourth geared wheels comprise sprockets coupled together by a chain for concurrent rotation.

20. The low horsepower transmission as recited in claim 16, wherein the first and second geared wheels comprise spur gears meshed for opposing rotation.

21. The low horsepower transmission as recited in claim 16, wherein the third and fourth geared wheels comprise spur gears meshed for opposing rotation.

22. A low horsepower transmission, comprising:

a drive shaft configured for being operably coupled to a prime mover and extending along a drive shaft axis;

a driven shaft extending along a driven shaft axis, the driven shaft axis being parallel to the drive shaft axis, the driven shaft being operably configured for being operably coupled to a rotary load, the drive shaft axis and the driven shaft axis being on a first plane;

first and second geared wheels being aligned and rotatably mounted on the drive shaft and the driven shaft, respectively, the first and second geared wheels being operable to transmit rotation therebetween;

third and fourth geared wheels being aligned and rotatably mounted on the drive shaft and the driven shaft, respectively, the third and fourth geared wheels being operable to transmit rotation therebetween;

a first clutch coupled to the second geared wheel on the driven shaft;

a second clutch coupled to the fourth geared wheel on the driven shaft;

a shifter axle extending parallel to the first plane, orthogonal to the drive shaft axle, orthogonal to the driven shaft axle, and over the drive shaft and driven shaft, the shifter axle operable for pivotal movement in response to actuation of a pivot shifter arm coupled thereto, the pivot shifter arm configured for traversing a second plane orthogonal to the shifter axle; and a shuttle clutch slidably secured to the driven shaft for lateral movement thereon, the shuttle clutch operable to reciprocate between mating engagement with the first clutch and mating engagement with the second clutch, the shuttle clutch being coupled to a yoke that translates the pivotal movement of the shifter axle into the lateral movement of the shuttle clutch on the driven shaft, wherein when the shuttle clutch mates with the first clutch, the first and second geared wheels transmit torque, and when the shuttle clutch mates with the second clutch, the third and fourth geared wheels transmit torque, and wherein opposing sides of the shuttle clutch are keyed to mate with the first and second clutches, respectively.

* * * * *